United States Patent
Ericson

(10) Patent No.: US 10,396,862 B1
(45) Date of Patent: Aug. 27, 2019

(54) COOPERATIVE MULTI-NODE MIMO FOR ENHANCED DEVICE TO DEVICE COMMUNICATIONS

(71) Applicant: Eagle Technology, LLC, Melbourne, FL (US)

(72) Inventor: Daniel W. Ericson, Hollis, NH (US)

(73) Assignee: Eagle Technology, LLC, Melbourne, FL (US)

( * ) Notice: Subject to any disclaimer, the term of this patent is extended or adjusted under 35 U.S.C. 154(b) by 0 days.

(21) Appl. No.: 15/990,307

(22) Filed: May 25, 2018

(51) Int. Cl.
| | |
|---|---|
| *H04B 7/02* | (2018.01) |
| *H04B 7/024* | (2017.01) |
| *H04B 7/0408* | (2017.01) |
| *H04B 7/0413* | (2017.01) |

(52) U.S. Cl.
CPC .......... *H04B 7/024* (2013.01); *H04B 7/0408* (2013.01); *H04B 7/0413* (2013.01)

(58) Field of Classification Search
None
See application file for complete search history.

(56) References Cited

U.S. PATENT DOCUMENTS

| | | | |
|---|---|---|---|
| 2008/0274692 A1 | 11/2008 | Larsson | |
| 2012/0275369 A1* | 11/2012 | Zhang | ................. H04L 12/1881 370/312 |

OTHER PUBLICATIONS

Eriksson, M., eet al., "Transmitter Macrodiversity in Multihopping—SFN Based Algorithm for Improved Node Reachability and Robust Routing," World Academy of Science, Engineering and Technology, International Journal of Computer and Information Engineering, vol. 4, No. 4, 2010.

* cited by examiner

*Primary Examiner* — Adolf Dsouza
(74) *Attorney, Agent, or Firm* — Fox Rothschild LLP; Robert J. Sacco; Carol E. Thorstad-Forsyth

(57) ABSTRACT

Cooperative multi-node MIMO communications involves a second wireless communication device (WCD) or more generally a self-selection of devices which selectively assists a first WCD with respect to communication of a first message to a third WCD. This assistance involves transmitting the first message using the second wireless communication device. More particularly, transmission of the first message by the second wireless communication devices is performed synchronously with at least one retransmission of the first message by the first wireless communication device. This retransmission is performed at a predetermined retransmission time known to both the first and second wireless communication devices.

20 Claims, 4 Drawing Sheets

COOPERATIVE MULTI-NODE MIMO FOR ENHANCED DEVICE TO DEVICE COMMUNICATIONS

BACKGROUND

Statement of the Technical Field

The technical field of this disclosure comprises communication networks, and more particularly concerns methods and systems for improving peer to peer communication performance between user equipment.

Description of the Related Art

The related art concerns telecommunications systems and more particularly wireless telecommunication systems. In the context of these types of systems, Long-Term Evolution (LTE) is a well-known standard for cellular communications based on the GSM/EDGE and UMTS/HSPA technologies. The LTE standard was developed by the 3rd Generation Partnership Project (3GPP). LTE is primarily a cellular technology which is centered around the concept of a cellular base station. In LTE systems, the base station is often referred to as an Evolved Node B or as eNB). The eNB manages various communications tasks ranging from communications with mobile user equipment (UE) handsets, radio management, and handover decisions. But beginning with Release 12, the 3GPP specification has included a direct peer-to-peer type of communications known as Proximity Services (ProSe) or Device-to-device (D2D).

LTE D2D enables LTE based peer devices or UEs to communicate directly when they are in close proximity to each other. This type of UE communication is sometimes referred to as a "sidelink," to be distinguished from UE uplink and downlink communications with an eNB. A motivation for adding D2D in LTE is to help facilitate communications among public safety services when cellular networks fail or are otherwise unavailable. D2D sidelink communications can occur when two or more peer devices are both within a coverage area of an eNB, both outside the coverage area of the eNB, or when one participating UE is in coverage and a second participating UE is out of coverage.

In addition to direct peer-to-peer communications, various unique capabilities are facilitated by D2D communications. For example, in a D2D relay scenario an in-network UE can use D2D sidelink communications with a remote UE that is currently outside the coverage area of an eNB. As such, a UE can function as a relay node in this scenario.

Radio resources for D2D sidelink communications can be allocated in accordance with a scheduled mode or an autonomous mode. In the scheduled mode, the eNB will specify the physical resources a particular UE should utilize in connection with a sidelink communication. In an autonomous mode, the UE will independently select the physical resources from a known predetermined resource pool.

D2D communications require a degree of synchronization to facilitate demodulation of transmitted data communicated between peer devices. As will be appreciated, this synchronization will necessarily involve both frequency synchronization and timing synchronization. The LTE standard provides that different synchronization methods can be applied in different scenarios. In a scenario where both UE are in communication with an eNB, then the synchronization function can be facilitated by the eNB. In other scenarios, the UEs will independently establish synchronization as between peer nodes.

SUMMARY

This document concerns a method for implementing cooperative multi-node multiple input multiple output (MIMO) device-to-device communications. The method involves decoding in one or more second wireless communication devices a first message included in a first wireless transmission received from a first wireless communication device. According to one aspect, the second wireless communication device selectively assists the first wireless communication device with respect to communication of the first message to a third wireless communication device. This assistance is provided by subsequently transmitting the first message using the one or more second wireless communication devices. More particularly, transmission of the first message by the one or more second wireless communication devices is performed synchronously with at least one retransmission of the first message by the first wireless communication device. This retransmission is performed at a predetermined re-transmission time known to both the first and second wireless communication devices.

To facilitate implementing cooperative multi-node MIMO in the device-to-device communications described herein, the first messages transmitted by both of the first and second wireless communication devices are matched with respect to frequency, coding and timing. In some scenarios, the first, second and third wireless communication devices which participate in the method described herein will communicate with each other in accordance with an LTE standard for device to device communication. In such a scenario, the first message can be selected from the group consisting of a control message and a data message.

A support selection algorithm (SSA) can be applied in the one or more second wireless communication device to selectively determine whether the second wireless communication will facilitate the communications of the first wireless communication device. Predetermined criteria evaluated by the SSA can be selected from the group consisting of a characteristic of the received signal and a device state of the second wireless communication device.

The solution disclosed herein can further involve decoding in the third wireless communication device the first message received from the second wireless communication device. The third wireless communication device can then selectively assists the first wireless communication device with respect to communication of the first message to a fourth wireless communication device by subsequently transmitting the first message using the third wireless communication device. In this regard, the transmission of the first message by the third wireless communication device is performed synchronously with at least one retransmission of the first message by the first wireless communication device. This transmission occurs at a predetermined re-transmission time known to the first, second and third wireless communication devices.

If the first message is a control message the method can further involve subsequently decoding in the second wireless communication devices a second message. This second message can be a message included in a second wireless transmission received from the first wireless communication device. For example, the second message can be a data message that is different than the first message. Thereafter, the communications process can be further facilitated by using the second wireless communication device to assisting the first wireless communication device with respect to communication of the second message.

More particularly, the second wireless communication device can be used to help facilitate communication of the second message to the third wireless communication device by subsequently transmitting the second message, using the one or more second wireless communication devices. The second message transmission by the one or more second wireless communication devices is performed synchronously with at least one retransmission of the second message by the first wireless communication device. In particular, this transmission will occur at a predetermined re-transmission time for the second message that is known to both the first and second wireless communication devices.

The solution disclosed herein can be carried out by a wireless communication device, such as an LTE handheld communication device. Such a wireless communication device can include a transceiver system which is configured to receive and decode the first message included in the first wireless transmission. Further, the wireless communication device can include a control system. The control system can be configured to selectively determine whether the wireless communication device will support or assist the first wireless communication device with respect to communication or transmission of the first message to one or more remote wireless communication devices. As explained above, such assistance can involve transmission of the first and/or message by the transceiver system synchronously with at least one retransmission of such message by the first wireless communication device.

BRIEF DESCRIPTION OF THE DRAWINGS

This disclosure is facilitated by reference to the following drawing figures, in which like numerals represent like items throughout the figures, and in which.

DETAILED DESCRIPTION

Figure 1:
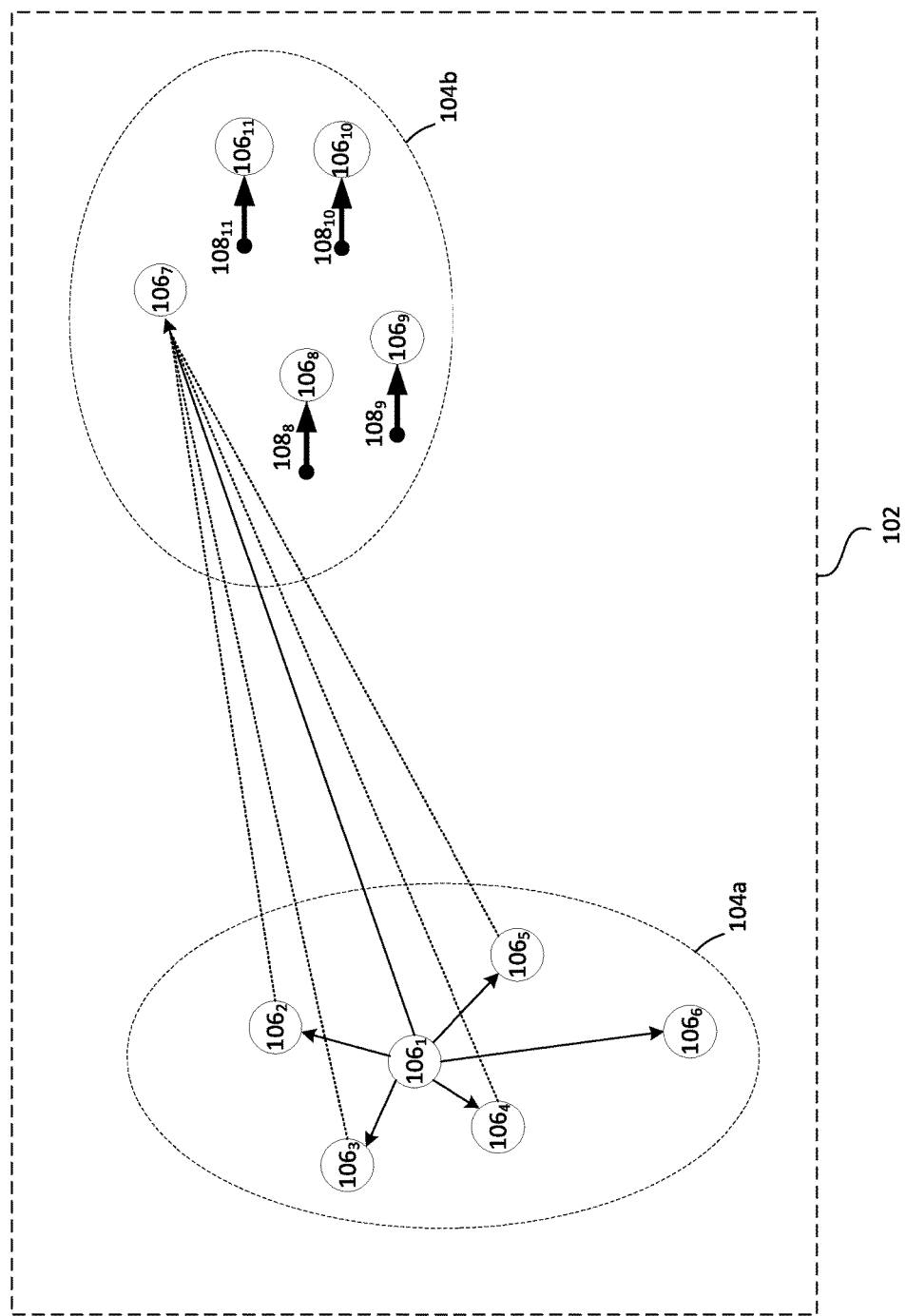
FIG. 1 is a diagram of a communication network operating in a device-to-device communication mode, and which is useful for understanding a process involving macro-diversity communications.

It will be readily understood that the components of the systems and/or methods as generally described herein and illustrated in the appended figures could be arranged and designed in a wide variety of different configurations. Thus, the following more detailed description, as represented in the figures, is not intended to limit the scope of the present disclosure, but is merely representative of certain implementations in various different scenarios. While the various aspects are presented in the drawings, the drawings are not necessarily drawn to scale unless specifically indicated.

In a solution disclosed herein, the performance of ProSe or D2D sidelink communications is improved by a macro-diversity technique implemented by proximate supporting UE peer devices. In a D2D communication session disclosed herein, a first UE device will transmit a sidelink data signal to facilitate a direct user communication with a second UE device or to a group of devices with a particular affiliation. Other enabled UE devices (e.g. a third and fourth UE) will receive this first transmission and attempt to decode same. If the decoding is successful, these other UE devices (e.g., third and fourth UE) will re-transmit the message synchronously with the planned retransmission times of the first UE. These retransmissions will provide at least two important advantages for purposes of ensuring that the message associated with the first transmission is ultimately received at the second UE device. A first advantage is that the multiple synchronized transmissions will result in a higher combined net transmit power during each retransmission time. A further benefit is that the synchronized retransmission from the third and fourth UE devices will facilitate transmitter diversity. Details of the solution are presented below.

It is well-known that MIMO or Multiple Input Multiple Output technology can be used in a communication system to improve system performance and/or achieve higher data rates. In MIMO communication systems the sender can transmit k messages simultaneously through a medium using different (m) launch positions that are usually very closely spaced compared with the distance to the receiver. The medium (which is usually slowly time varying relative to the information rate sent by the transmitter) introduces various impairments to the messages being sent. These impairments can include: (1) multipath—in traveling between the transmitter and receiver the message may travel multiple paths with inherently differing path lengths by for instance reflecting off various surfaces within the environment; (2) noise—incoherent energy associated with the medium that is added to the signal; and (3) message combining—the multiple messages sent simultaneously arrive coincidently at a receiving element as a sum, so the relative strength of each message depends upon the medium losses between sender and receiver elements.

A receiver in a MIMO system has n receiving elements. Each of these receiving elements sample the medium at different physical locations. These different locations are sufficiently spaced to provide separate representations of the transmitted signal, but they are usually spaced much closer than the distance between transmitter and receiver. Separate transmitted messages may be fully recovered at the receiver provided that the combined messages sampled at the receiver elements can be separated. For this combining process the medium can be modelled as a matrix multiplication of m launch positions into n receiver elements. Therefore the medium matrix can be inverted and effectively cancelled, provided that the number of messages k is less than or equal to the lesser of m and n.

If m and/or n are larger than k then redundancy is introduced into the signal path. Proper signal processing can combine these redundant paths, which improves the signal quality of detected messages and therefore allows them to be decoded at lower signal quality levels. Communication that combines redundant paths is often referred to as providing diversity.

Macro diversity removes the usual circumstance in which transmitting launch positions and/or receiving elements are closely spaced. Similar signal processing gains are achieved with both macro-diversity and more conventional diversity receiving schemes. However, in practice macro-diversity is more difficult to implement because transmitting and receiving elements that are widely spaced must be properly synchronized.

An LTE network type of configuration is one in which all communications are between UE (e.g., a cell phone handset) and the eNB (enhanced node B base station). A conventional LTE airlink in such a configuration makes use of MIMO that enables: multiple data streams (spatial multiplexing), diversity, and macro-diversity. A common configuration in network operation is 4×2 MIMO in the downlink. In this configuration the eNB transmits 4 signals, while the UE receives using two antennas. Consequently, 2 spatially multiplexed streams may be supported and the additional transmitter signals provide diversity gain.

ProSe (D2D) is a mode of LTE communications that permits UEs to communicate information directly between devices without an intervening eNB or other networking functions. For commercial applications, the LTE network will maintain the control and management functions of a UE operating in D2D, but allows the direct communication of user data between devices. A classic example would be sharing a photograph between two phones that are next to each other.

Public safety communication requirements include the ability for UE devices to communicate autonomously without any required intervention from an eNB and the network accessible from the eNB. In some advanced modes disclosed herein, advantaged performance is obtained in such autonomous operation (although these concepts can also be utilized within a network setting). Within the literature and standards, such autonomous operations are generally referred to as public safety mode.

Public safety D2D communications capabilities are necessarily more limited than network operations. Cell phone handset types of UE which support LTE will commonly have a single transmitter and two receivers. This arrangement will permit the UE operating in D2D mode to support 1×2 diversity, but not spatial multiplexing.

In network operations, the eNB orchestrates all communications to its served UE's. This control manifests as explicit scheduled reception windows and explicit transmission RB (resource blocks—time and frequency scheduled units). This explicit schedule serves to allow UE receivers to conserve power when no messages are expected and, more importantly for purposes of this discussion, coordinates transmissions from the UE to the eNB. The eNB has limited ability to simultaneously receive signals from multiple UE and therefore scheduling serves to ensure that the UL (uplink—communication from UE to eNB) as received by the eNB is consistent with the capabilities of the eNB to receive coincident signals.

In contrast, D2D public safety communication mode consists of a cluster of UE. The cluster or group of UE has limited information about when they may receive relevant communications and must coordinate transmissions using a distributed mechanism as the UE operate as peers. Based on such limited information, the UE can utilize an RF resource selection algorithm (RSA) which is intended to help minimize the chances of communication collisions. In network operations, a singular coordinator, the eNB can prevent transmissions from multiple UE transmitters which would otherwise interfere with reception at the eNB. In contrast, distributed coordination, inherent to public safety D2D, at best can try to anticipate when the channel is free for transmission. In such scenarios a UE can monitor activity on a particular channel and apply an algorithm to decide when transmissions are less likely to cause data collisions. Ultimately, however, a UE has no way to know whether another UE is also simultaneously performing the same actions, and data collisions may occur.

Another limitation of conventional public safety D2D communications involves reliability. Public safety most frequently involves communications in groups that provide rapid dispersal of information to group stakeholders. Ideally in a D2D group communication, a transmitting device is heard by all members of the group. However, communication is limited as a practical matter by various problems associated with (1) clear channel propagation limitations and (2) by collisions from other UE transmitters sending other messages that may overlap.

It is well-known that unicast communications can be improved with respect to their reliability by introducing the utilization of an acknowledgement channel. This feedback channel signals the transmitter that a message has been decoded or in the absence of acknowledgement that the message was not decoded. But a useful acknowledgement channel in group communications is much more difficult as it may not be possible to detect that all potential recipients received the message or to define what criteria should be used to re-send a message. This problem was recognized during the D2D standards development and the prescribed solution was for a transmitter operating in D2D mode to repeat messages. While repeated messages by a transmitter increase channel loading, such repetition can significantly improve the likelihood that a message will be successfully delivered for situations were channel loading is moderate.

Another limitation of D2D communications involves the relatively poor reliability performance. In fact, with D2D the total RF channel losses that may permissibly occur while still allowing the receiver to decode the transmitted signal are substantially lower as compared to legacy narrowband public safety direct communications. Consequently, even with a clear channel, D2D communications cannot reliably communicate over established distances provided by existing technology. Of course, conventional repeater systems can be used to extend RF communications range and lessen the adverse effects that collisions can have with respect to communication reliability. However, a repeater/relay first captures a message, then resends the message, thereby using twice as many channel resources with a single hop.

Accordingly, there is presented herein a solution which solves many of the problems which plague communications associated with D2D in LTE and in particular D2D operated in accordance with public safety mode. However, it should be appreciated that the solution presented is not limited to use in connection with such D2D operations. Instead, the solution has broad applicability to a wide range of communication scenarios involving wireless communications devices which are capable of direct communications. As used herein direct communication devices can be understood to include wireless devices which communicate without requiring intervening nodes or networks. One or more UEs configured for operating in accordance with an LTE D2D mode as described herein would be one example of devices which are configured for such direct communications.

A direct communication device, such as an LTE UE operating in D2D mode will inherently have a more distributed arbitration of RF resources. For example, in an LTE D2D scenario as described herein, a UE device will before each communication burst, attempt to minimize collisions with transmissions by other devices by (1) sensing channel activity and (2) applying an RF resource selection algorithm (RSA) that is configured to minimize interference between communicating devices. The details of such algorithm are not critical. However, it will be appreciated that the algorithm may delay transmission due to activity, choose a frequency allocation, select time segments, and/or coding techniques at the transmitter. All of the foregoing actions can be selected in accordance with a particular RSA so as to maximize a remote receiver's ability to decode message energy it captures. More generally, these actions can be designed to maximize the receive capability of all the nodes in a direct communication network as an aggregate.

Generally, a receiver in such a direct communication scenario can decode messages that are not corrupted by too much environmental noise or interference. Environmental noise sets a limitation on how far messages can be sent when intra-system interference is not significant. For purposes of this discussion interference that is external to an LTE system is considered environmental noise. Interference within a particular communication system (e.g., an LTE D2D communication system) may be managed by the design and configuration of the system.

System transmissions that overlap at a receiver may be separable or inseparable. For instance, transmissions that use differing allocations of time, frequency, or coding are generally separable and simultaneously decoded, if they are received with sufficient signal quality, commonly measured as signal to interference and noise ratio (SINR.) Limitations in processing gain and receiver performance, set bounds on the ratio of signal strengths that may be recovered simultaneously. By example a dominant signal that arrives at a receiver may suppress the signal quality of weaker signal preventing it from being decoded even if the signals use different frequency allocations. In contrast multiple signals of similar spectral density but different transmission characteristics (time, frequency, and coding) may be simultaneously decoded. When coincident signals arrive with the same time, frequency, coding, and relative signal strength this is commonly referred to as a collision because decoding generally fails for all such signals.

Because each device arbitrates independently, the RSA in a direct communication system (such as LTE D2D) can statistically minimize the chances of collisions, but cannot eliminate them. Generally, as the RF channel becomes more busy, the reliability of communications will naturally suffer. For example, a receiver may fail to decode a desired signal because: (1) the RF signal is unavailable because of a transmission (half duplex), (2) RF losses are too high between the receiver and transmitter, (3) the receiver may experience a collision between transmissions, (4) other signals in aggregate or individually may be strong enough at the receiver to suppress a desired transmission, (5) shared resource elements (6) different resource elements and/or (7) the presence of adjacent band energy.

As is known, a communication system can employ block duplication at the transmitter and this technique can serve as an effective mechanism for improving message delivery. This technique is in fact utilized in LTE D2D communications. However, this form of redundancy does not fully exploit the spatial diversity of the RF channel. In this regard it should be noted that resends of data blocks occur over millisecond time scales. So in a scenario involving typical walking speeds expected for most D2D operations, the RF channel is essentially static. Therefore, benefits from re-transmissions are limited to aggregated power across transmissions, lowered collision probability, and lower probability of a blocking interference channel. Accordingly, benefits associated with time and spatial diversity of the channel are not effectively exploited.

A direct communication system may in some scenarios take advantage of a repeater or relay to extend its reliable reach. In a sense, such a system is not strictly a direct communication system since the repeater or relay will in some respects serve as intervening nodes. However, a conventional relay node in such a scenario could receive a direct communication message (including any redundant transmissions), arbitrate for the RF channel it needs to communicate and then re-transmit the message. In such a scenario, it will be appreciated that the relay node will inevitably consume more channel resources by retransmitting using separate RF resources. Further, the receiving and transmission RF links of the relay are necessarily limited by the base capabilities of the direct communication device (e.g., an LTE UE device).

The use of conventional relays is further limited by their quasi-static nature. Generally, relays are configured to address presumed messaging traffic before traffic may even exist. Therefore, they are not able to react to and support time varying loads that may not be supported by a configured set of relays. Devices on the move further challenge relay configurations. Optimum selection of relays is in general different for each talkgroup and for the dynamic clusters of locations associated with each. Relay management is clearly complicated and must be handled carefully to tradeoff additional system loading with improved talk group communication reliability.

Also, the density of relay distribution must be very carefully managed to tradeoff the potential improved coverage against the loss in capacity due to resent transport blocks from relaying. The limited density of relays also means that physical placement of a relay will be an important part of the design to achieve a desired communication goal. In some instances, this goal might be to reach an isolated cluster of devices. In others it might involve improving coverage for a dispersed, but relatively uniformly distributed group. In general, selecting devices to become relays is not obvious and can be expected to vary with each talkgroup.

The solution proposed herein is a new approach that more fully exploits the dimensionality of the available RF medium, adapts to moving nodes, and is adaptable to the current system loading conditions. Consider a common public safety use case involving a response to an emergency incident. Depending on the nature of the incident the response scale may vary greatly. For a moderate to large scale incident, first response may begin with a single officer providing initial assessment and aid. Initial response is then followed by additional first responder groups with differing missions and jurisdictions. Responders include: public safety officers, firemen, and emergency medical personnel. As the response grows an incident command may be staged to allow team leaders to coordinate operations, while providing command to their teams. Groups and Incident Command personnel tend to have clusters of activity with some additional personnel that may be more evenly distributed. While a particular group of communicators may be relatively clustered, individual personnel will continue to rely on their own communication device. The reasons for this may vary but in general operational environments may be noisy, hazardous, or require covert maneuvers in which a personal device provides distinct advantages.

Team Cluster Scenario

In some scenarios, involving an emergency incident as described herein, wireless communication devices working in proximity may be able to provide advantaged communications. Depending upon configuration, advantaged communications may be provided by members of a communication group or by any local wireless communications devices with this behavior enabled. Advantaged communications may also be governed by the priority of digital communication.

Mechanisms for message prioritization based on device, user, and message type are typically part of wireless communications protocol and are included in D2D 3GPP specifications. In order to understand this aspect of the solution there is illustrated in FIG. 1 a scenario in which a group of team members are individually equipped with wireless communication devices or UEs $106_1$-$106_{11}$ which together comprise a group 102. The UEs $106_1$-$106_{11}$ are configured for direct communication operation and to provide advantaged communications. For convenience, it will be assumed that the direct communication mode is an LTE type D2D public safety mode. However, the solution can be used with other types of direct communication modes as noted herein.

The communication devices $106_1$-$106_{11}$ in this example are distributed over a geographic area in two primary clusters 104a, 104b which are separated by some distance. The desired behavior is that whenever any member of the group 102 transmits a message that all member will receive the message.

According to one aspect, the solution disclosed herein can leverage certain aspects of an LTE D2D protocol to provide a form of diversity communications to improve delivery range and reliability. In other scenarios, similar results can be achieved in any other type of direct communication system in which a transmitting device resends the same data two or more times to enhance communication reliability.

In the scenario shown in FIG. 1, a transmitting UE $106_1$ is proximately located with other UEs $106_2$-$106_6$ which are all part of the same primary cluster 104a. Since the UEs in this example are operating in accordance with an LTE D2D public safety mode, the first transmission from UE $106_1$ will be a control message CM1 sent at time $T_{CM1}$. The second transmission CM2 from UE $106_1$ follows shortly thereafter at time $T_{CM2}$ and will be a resend or retransmission of the same control message CM1. Following these control messages, the transmitting UE $106_1$ will transmit a data message DM1 at time $T_{DM1}$. The same data message is sequentially repeated three times shortly thereafter as DM2, DM3 and DM4 (at times $T_{DM2}$, $T_{DM3}$ and $T_{DM4}$). These retransmissions are performed to improve the reliability of message communications. The exact timing of the various retransmissions described herein are specified in accordance with the well-known communications standard established for LTE D2D. Since the UEs in primary cluster 104a are all in relatively close proximity, they are all successful in this example at receiving the control messages CM1, CM2 and the data messages DM1-DM4 which are sent by the transmitting device UE $106_1$.

The UEs $106_2$-$106_6$ in cluster 104a, upon receiving each of the above-described messages will each selectively perform re-transmissions of the received message synchronously with the re-transmissions of UE $106_1$. For example, a UE $106_2$-$106_6$ receiving a first control message CM1 may according to its configuration, policy, and signal metrics choose to also transmit the same message during the predetermined retransmission time $T_{CM2}$. In doing so, a UE $106_2$-$106_6$ which transmits will precisely match its transmission with respect to the timing, frequency, and coding of retransmissions by UE $106_1$. In some scenarios, this matched transmission may be deployed by several UEs $106_2$-$106_6$ in proximity. Consequently, the net signal that arrives at receiving devices $106_7$-$106_{11}$ will exhibit at least three distinct advantages which are described below in greater detail.

Assume that each of UEs $106_2$-$106_5$ determine that they will transmit messages from UE $106_1$ during a predetermined retransmission. The resulting signal received at $106_7$-$106_{11}$ will be comprised of the aggregated power from the transmitters $106_2$-$106_5$ attenuated by their respective propagation paths. On average, for a receiving UE separated by many wavelengths from the cluster of transmitting devices $106_1$-$106_5$, the equivalent transmission power is roughly the sum of all the transmitters. So a first advantage of the approach described herein is that the receiving UEs will receive a composite signal which has a significantly higher equivalent transmission power. In FIG. 1, this power aggregating effect is explicitly illustrated with respect to UE $106_7$ but for greater clarity in the drawing is only symbolized with arrows $108_8$-$108_{11}$ with respect to the remaining UEs $106_8$-$106_{11}$.

A further advantage of the technique described herein is that a transmitted signal associated with each UE $106_1$-$106_6$ will experience localized fading depending on its precise location. When multiple matched transmitted signals from UEs $106_1$-$106_6$ are received, the negative effects normally associated with localized fading will be greatly diminished due to the low probability that all propagation paths are in a significant fade.

A third advantage of the solution described herein derives from the fact that propagation paths may be subject to barriers and shadowing. In this context, it is helpful to consider a scenario in which a physical barrier of some kind is at least partially blocking signal propagation in a projected direction of a receiver associated with a target UE. The term "shadowing" is sometimes used to refer to a situation where a straight-line path between transmitter and receiver is entirely blocked. Also, it is well known that other mechanisms can support a path that is not entirely blocked but may include significantly more attenuation. Examples of such conditions can include: diffraction, refraction, and reflections of RF signals. But when multiple UEs $106_2$-$106_5$ are configured to match retransmissions from UE $106_1$ as described herein, the likelihood of all paths being blocked or shadowed at the same time is greatly reduced. Also, it should be understood that the UEs $106_7$-$106_{11}$ do not necessarily need to be in a cluster as shown in FIG. 1 and can instead simply receive signals independently.

Figure 2:
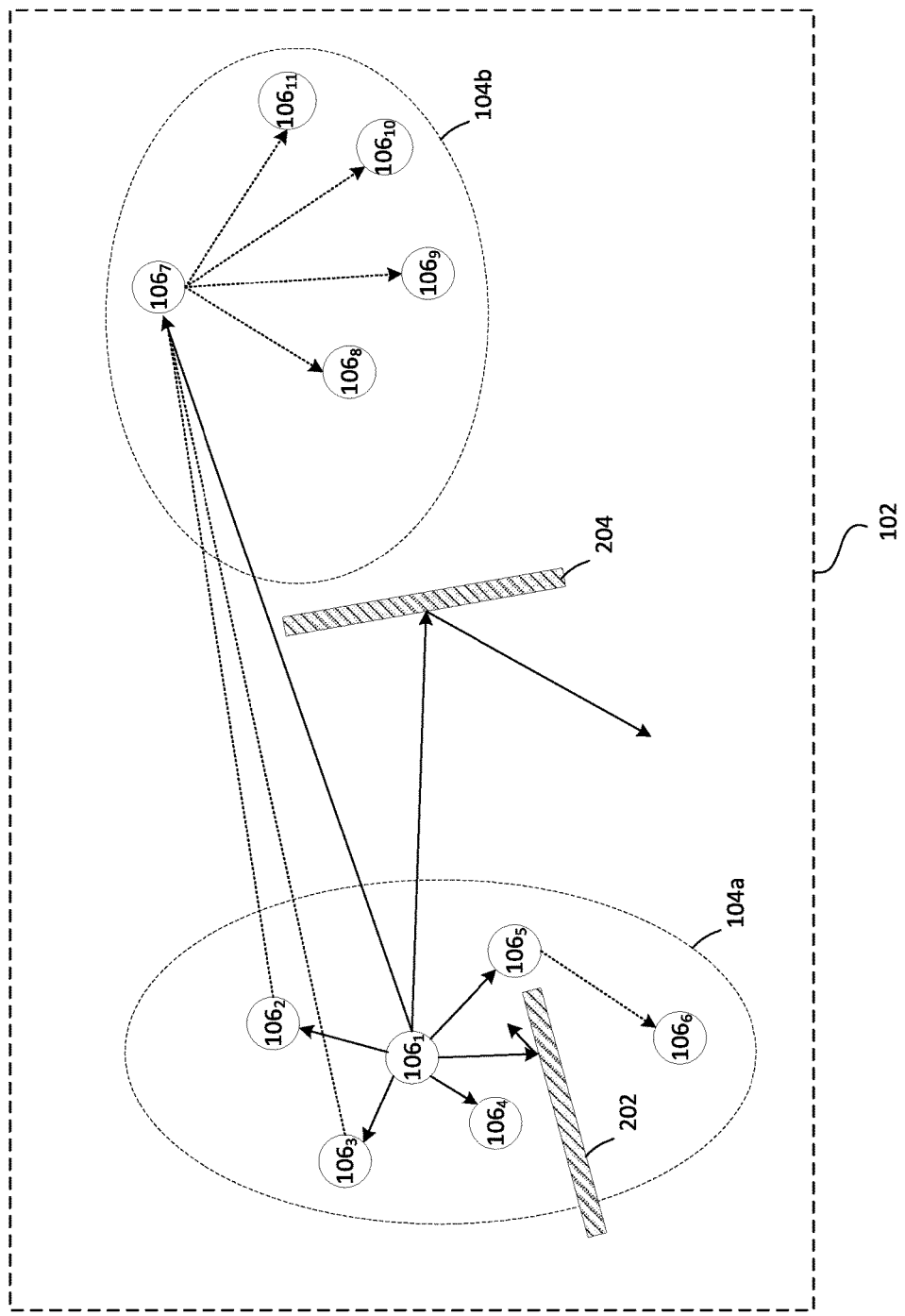
FIG. 2 is a diagram of the communication network in FIG. 1 in a scenario involving signal obstructions.

In a second scenario which is shown in FIG. 2, a similar communication environment involving UEs $106_1$-$106_{11}$ includes obstacles 202, 204 in the propagation path between certain UE nodes. In this scenario assume that the originating control message CM1 transmitted from UE $106_1$ only reaches a single device $106_7$ in cluster 104b. A retransmission of the control message at $T_{CM2}$ by UE $106_7$ will ensure delivery of the control message to UEs $106_8$-$106_{11}$. Similarly, when the data portion of the message is re-sent by UE $106_1$ as DM2-DM4 at times $T_{DM2}$, $T_{DM3}$ and $T_{DM4}$, matched transmissions will be sent synchronously by UE $106_7$ and the resulting signal will be received at UEs $106_8$-$106_{11}$.

In an LTE D2D scenario, the data message usually requires a higher signal quality than the control message in order to be properly decoded at the receiver. Consequently, it is anticipated that there may be some instances when the initial transmission of DM1 from a UE $106_1$ to a UE $106_7$ may fail, whereas during the re-transmission (DM2) an aggregate signal from UEs $106_1$-$106_3$ is in fact received and decoded by UE $106_7$. In such a scenario, UE $106_7$ may be configured to transmit at $T_{DM3}$ and $T_{DM4}$ to provide messaging to devices $106_8$-$106_{11}$. Similarly, there may be some scenarios in which UE $106_7$ will transmit only during the fourth transmission period (at $T_{DM4}$) if the transmissions DM1 and DM2 have failed, but DM3 is received.

In some scenarios a message initiating device such as UE $106_1$ may also benefit from knowing that other UE devices are available to provide retransmissions. Consequently, an initiating device such as UE $106_1$ may be configured to selectively listen during certain re-transmission periods. For example at re-transmission periods at $T_{CM2}$ and/or $T_{DM2}$-$T_{DM4}$ at UE $106_1$ can listen for other supporting UEs which are transmitting CM2 and/or DM2-DM4 rather than transmit during such periods. Consequently, the initiating transmitter (e.g., UE $106_1$) can sense whether other supporting UE devices are transmitting. This information can be evaluated and used by an initiating UE for various purposes. For example, if a UE $106_1$ is experiencing a low battery condition, then it could choose to allow the re-transmissions occurring at $T_{CM1}$ and/or $T_{DM1}$-$T_{DM4}$ to be handled exclusively by supporting UEs such as UE $106_2$, $106_3$ and $106_7$.

The solution disclosed herein advantageously avoids the quasi-static nature of conventional wireless relays. Further, it facilitates a solution in which all UEs which receive an initial transmission (e.g., CM1 or DM1) can act as diversity transmitters rather than as mere relays.

As noted herein, a UE can selectively determine whether it will or will not act as a supporting transmitter to retransmit messages on behalf of a UE which initiates a message. In order to facilitate such determination, the UE can make use of a support selection algorithm (SSA). The SSA will apply certain criteria so as to determine based on instantaneous conditions whether a given device will act as a supporting transmitter. In some scenarios, the criteria that are considered can be associated with the received signal (e.g. CM1 and/or DM1, DM2) and/or device state of the UE which is determining whether or not to act as a supporting transmitter. For example, a UE may use: configuration, received signal quality, message priority, assessments of the number of other supporting local devices and other information to determine whether it provides a supporting role for a particular message. This adaptive approach allows the solution disclosed herein to more effectively adjust to dynamic communication conditions and/or considerations involving message priority.

Figure 3:
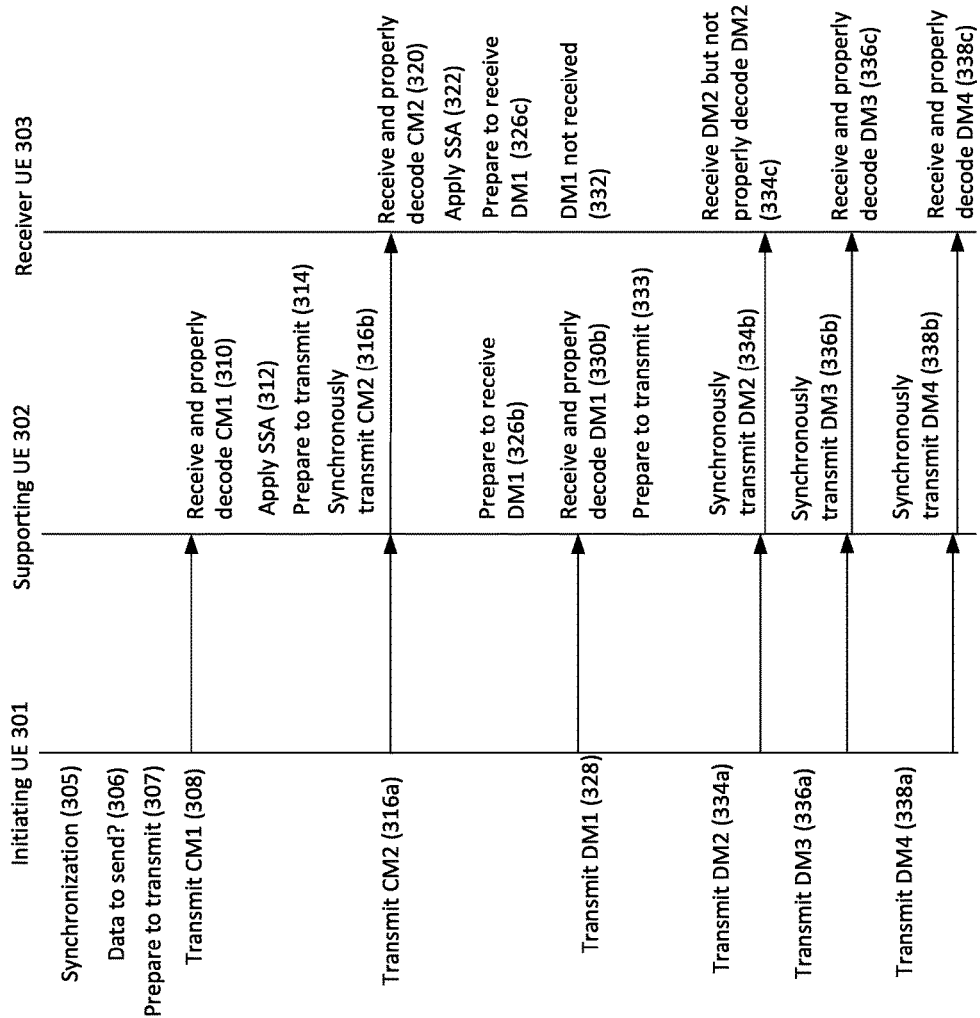
FIG. 3 is a communications timing diagram that is useful for understanding macro-diversity communications.

To illustrate the function of the SSA a more detailed description of a sequence of events associated with a message transmission will now be provided with respect to FIG. 3. As a prerequisite to carrying on the type of direct communications techniques described herein, it is understood that a communication device (e.g., UE 301) must establish time synchronization 305 with the other UEs (e.g., UE 302) which are participating in the direct communication session. The details of various time synchronization techniques which can be applied to facilitate this result are well-known in the art and will therefore not be described here in detail. However, it will be appreciated that an LTE communication standard specifies certain time synchronization techniques which can be used in conventional D2D public safety mode in an LTE network. For example, a UE $106_1$ in such a scenario can act as its own synchronizer, can use synchronization information it has received from in-range UE devices, or can use synchronization information it has received from an eNB.

In FIG. 3, UE 301 will determine at 306 that it has data to be sent. UE 301 will then follows standard procedures (e.g., standard LTE D2D procedures) for preparing to transmit 307. The procedures can include sensing the RF channel and using a RSA (resource selection algorithm) to determine the timing, resources, and power of the transmission. The RSA will select both control and message parameters. Thereafter at 308 the device 301 will transmit control message CM1.

When device 302 sends out the first control message CM1 according to the RSA, devices within RF range may: (1) receive and properly decode the control message, (2) detect a message with errors, (3) not detect a desired message (4) not be receiving at the time of the message and therefore unaware that it occurred (for example, if transmitting at the time the message was sent (since communication is half duplex), or in the process of initializing communications), (5) unable to receive due to co-existence restrictions with another service.

In FIG. 3, it is assumed that supporting UE 302 does receive CM1 at 310 and is able to decode this initial transmission. Consequently, UE 302 will apply a SSA (support selection algorithm) at 312 to determine whether UE 302 will provide transmission support to the second control message from UE 301. A UE may use a variety of parameters to determine whether to provide transmission support including, but not limited to: received signal metrics, configuration, policy, prior transmissions, group demographics, battery life, message priority, and system loading. In this example, we assume that UE 302 determines based on its SSA that it will provide transmission support and therefore prepares to transmit at 314. This step of preparing to transmit will involve preparing a control message CM2 which matches the received CM1 message. Note that in this example, a UE 303 for some reason does not receive and/or decode CM1.

At 316a, 316b the initiating UE 301 and any supporting UE devices such as UE 302 will transmit synchronously during the repeated control message allocation time $T_{CM2}$. As a result of such transmissions at 316a, 316b certain UE devices, such as UE 303, which may not have received CM1, will in fact successfully receive and decode 320 the control message CM2. At 322 the UE 303 can apply its SSA to determine whether it should serve as a supporting UE device. In this example, it is assumed that UE 303 determines that it is not a supporting UE device. However, having now received the control message CM2, the UE 303 will proceed at 326c to prepare to receive a data message DM1, based on information decoded from the control message. Similarly, UE 302 will prepare to receive a data message at 326b.

At 328 UE 301 will sends a first data message DM1 according to the RSA. As will be appreciated, this may have various different effects upon devices within RF range. For example a UE may (1) receive and properly decode the data message, (2) detect a message with errors, (3) not detect a desired message (for example, the UE may not be receiving at the time of the message (another event in the device may have superseded), may be transmitting (communication is half duplex), may be in the process of initializing communications, or may be unable to receive due to co-existence restrictions with another service).

For purposes of this example, we assume that DM1 is received and properly decoded at 330b by a device UE 302, but is not received or decoded by UE 303. Devices able to decode this initial message transmission may respond in various ways to the received message. For example, UE 302 could decide in accordance with a SSA (support selection algorithm) whether to provide transmission support to the second data message from UE 301. In this regard, it should be understood that separate decisions may be made for the control and data components of a message. Devices such as UE 302 may use a variety of parameters to determine whether to provide transmission support including: received signal power, configuration, policy, retransmission count, message priority, and system loading.

In the scenario shown in FIG. 3 it is assumed that UE 302 determines that it will continue to function as a supporting device, and therefore will prepare a data message DM2 that matches DM1, and will prepare to transmit at 333. Thereafter, UE device 301 and any supporting devices (such as UE 302) will transmit DM2 synchronously 334a, 334b during a predetermined time $T_{DM2}$ which has been allocated for the second data message.

Additional UE devices may successfully decode the DM2 message. These devices may then decide to add transmission support according to an SSA for a third transmission (DM3). Conversely, UE devices that provided support during the second transmission may continue by supporting the third or may not transmit. A decision to not transmit could be based on the SSA or the device may be preempted by some other event. Also, it should be appreciated that a UE device (e.g., UE 301) may determine based on an SSA not to transmit and to instead use the transmission period to listen for supporting devices.

In the example shown in FIG. 3, it is assumed for purposes of illustration that for some reason DM2 is not received or decoded at 334c by the UE 303. However, the same transmission is repeated at 336a, 336b as DM3 at $T_{DM3}$. In this transmission instance the data message is in fact received and decoded at 336c by the UE 303.

In some scenarios, after receiving and decoding DM3, UE 303 may apply its SSA and determine not to assist UE 301 with communicating the message. Such a scenario is illustrated in FIG. 3. In such instances, UE 303 can simply choose to wait and also receive DM4 at 338c, when DM4 is retransmitted at 338a, 338b by UE 301 and UE 302. But in other scenarios, UE 303 (by applying its SSA) may determine that it should support UE 301. In such a scenario (not shown), UE 303 can instead provide assistance by transmitting DM4 in synchronicity with UE 301 and UE 302 at 338a, 338b.

From the foregoing it will be understood that following any of the message transmissions (e.g. DM1 or DM2) additional UE devices (not shown in FIG. 3) may successfully decode the data message. These devices may then decide to add transmission support according to the criteria defined by the SSA. Conversely, devices that provided support during a particular transmission may continue in this way by supporting with additional transmissions or may choose not to transmit. Such determinations can be handled by the SSA.

The solution disclosed herein is applicable to any communication system that is resilient to multipath reception, particularly multipath scenarios that arise due to the presence of multiple transmitters. An example of a direct communication UE device which can be used with the solution disclosed herein is a handset or mobile radio unit configured to function in accordance with an LTE communication standard which implements LTE D2D communications in a public safety mode. Still, it should be appreciated that (the solution disclosed herein is not limited to public safety mode). As such, a UE device as referenced herein can comprise one or more components such as a radio frequency transceiver and suitable control circuitry. The UE can include one or more of a microprocessor, an application specific circuit, a programmable logic device, a digital signal processor, and/or other circuits programmed to perform the functions described herein.

Figure 4:
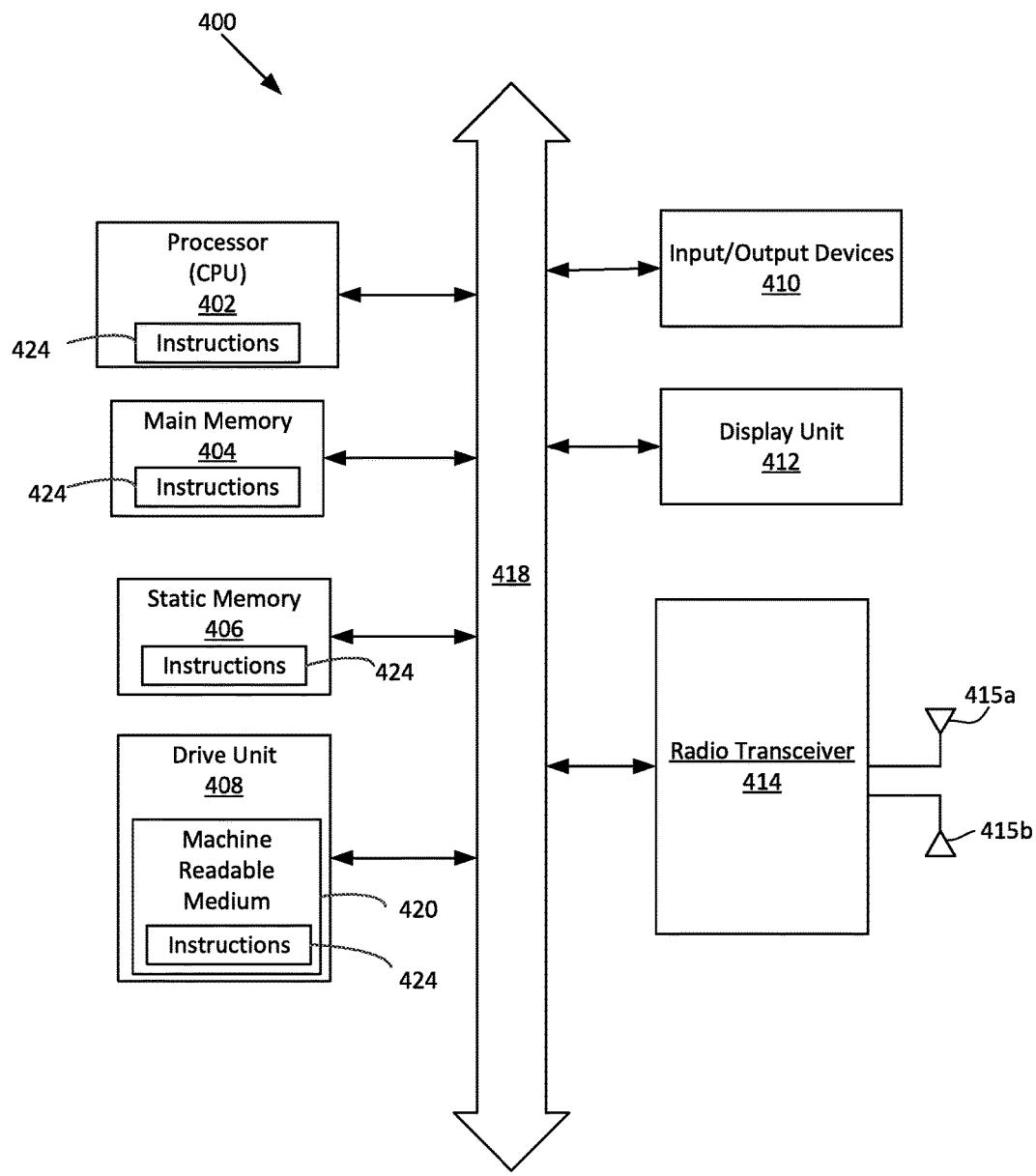
FIG. 4 is a hardware block diagram which is useful for understanding an example of a wireless communication device (sometimes referred to as User Equipment), which can function in a communication network operating in a device-to-device communication mode involving macro-diversity communications.

Referring now to FIG. 4, there is shown a hardware block diagram comprising an exemplary UE device 400. The UE device 400 includes a radio transceiver 414, one or more antennas 415a, 415b, and a control processor 402 which may be a central processing unit or CPU. Radio frequency transceivers are well-known in the art and therefore radio transceiver 414 will not be described here in detail. However, it will be appreciated that an RF transceiver 414 can be comprised of a receiver and a transmitter circuitry. The transceiver can also include including antenna switching circuitry and control devices, RF filters, radio frequency amplifiers, modulators, demodulators, oscillators and so on. In some scenarios, one or more such of these devices can be implemented in software executing on digital electronic processing element to facilitate a software defined radio.

The control processor 402 can include a set of instructions which are used to cause the UE to perform any one or more of the methodologies discussed herein. The UE 400 can also include a main memory 404, a static memory 406, and a drive unit 408 for mass data storage and comprised of machine readable media 420. The UE can comprise one or more input/output devices 410, a display unit 412 (e.g. a liquid crystal display (LCD) or a solid state display). Communications among these various components can be facilitated by means of a data bus 418. One or more sets of instructions 424 can be stored completely or partially in one or more of the main memory 404, static memory 406, and drive unit 408. The instructions can also reside within the processor 402 during execution thereof by the computer system. The input/output devices 410 can include a keyboard, switches, a multi-touch surface (e.g. a touchscreen) and so on.

The drive unit 408 can comprise a machine readable medium 420 on which is stored one or more sets of instructions 424 (e.g. software) which are used to facilitate one or more of the methodologies and functions described herein. The term "machine-readable medium" shall be understood to include any tangible medium that is capable of storing instructions or data structures which facilitate any one or more of the methodologies of the present disclosure. Exemplary machine-readable media can include a solid-state memory. More particularly, tangible media as described herein can include semiconductor memory devices, electrically erasable programmable read-only memory (EEPROM)) and flash memory devices. A tangible medium as described herein is one that is non-transitory insofar as it does not involve a propagating signal.

The UE 400 should be understood to be one possible example of a UE which can be used in connection with the various implementations disclosed herein. However, the systems and methods disclosed herein are not limited in this regard and any other direct wireless communication system architecture can also be used without limitation. Dedicated hardware implementations including, but not limited to, application-specific integrated circuits, programmable logic arrays, and other hardware devices can likewise be constructed to implement the methods described herein. In some scenarios, certain functions can be implemented in two or more specific interconnected hardware modules or devices with related control and data signals communicated between and through the modules, or as portions of an application-specific integrated circuit. Thus, the exemplary system is applicable to software, firmware, and hardware implementations.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with a particular implementation is included in at least one embodiment. Thus, discussions of the features and advantages, and similar language, throughout the specification may, but do not necessarily, refer to the same embodiment.

Furthermore, the described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

I claim:

1. A method for implementing cooperative multi-node multiple-input multiple-output (MIMO) enhanced device-to-device wireless communications, comprising:
    decoding in one or more second wireless communication devices a first message included in a first wireless transmission received from a first wireless communication device;
    autonomously performing operations by the one or more second wireless communication devices to
    selectively determine whether each of the one or more second wireless communication devices should facilitate the communications of the first wireless communication device, and
    assist the first wireless communication device with respect to communication of the first message to a third wireless communication device by subsequently transmitting the first message using the one or more second wireless communication devices, when a determination is made that the one or more second wireless communication devices should facilitate the communications of the first wireless communication device;
    wherein transmission of the first message by the one or more second wireless communication devices is performed synchronously with at least one retransmission of the first message by the first wireless communication device at a predetermined re-transmission time known to both the first wireless communication device and the one or more second wireless communication devices.

2. The method according to claim 1, wherein the first messages transmitted by both of the first wireless communication device and the one or more second wireless communication devices at the predetermined re-transmission time are matched with respect to frequency, coding and timing.

3. The method according to claim 2, wherein the first, second and third wireless communication devices communicate with each other in accordance with an LTE standard for device to device communication.

4. The method according to claim 3, wherein the first message is selected from the group consisting of a control message and a data message.

5. The method according to claim 4, wherein the first message is a control message and further comprising subsequently decoding in the one or more second wireless communication devices a second message included in a second wireless transmission received from a first wireless communication device, the second message comprising a data message that is different than the first message.

6. The method according to claim 5, further comprising assisting the first wireless communication device with respect to communication of the second message to the third wireless communication device by subsequently transmitting the second message using the one or more second wireless communication devices.

7. The method according to claim 6, wherein transmission of the second message by the one or more second wireless communication devices is performed synchronously with at least one retransmission of the second message by the first wireless communication device at a predetermined re-transmission time for the second message that is known to both the first and second wireless communication devices.

8. The method according to claim 1, further comprising:
    decoding in the third wireless communication device the first message received from the one or more second wireless communication devices; and
    selectively assisting the first wireless communication device with respect to communication of the first message to a fourth wireless communication device by subsequently transmitting the first message using the third wireless communication device, wherein transmission of the first message by the third wireless communication device is performed synchronously with at least one retransmission of the first message by the first wireless communication device at a predetermined re-transmission time known to the first, second and third wireless communication devices.

9. The method according to claim 1, wherein the selective determination as to whether each of the one or more second wireless communication will facilitate the communications of the first wireless communication device is based on at least one of a device configuration, a characteristic of the first wireless transmission, a priority of the first message, and an assessment of a number of other supporting local devices.

10. The method according to claim 9, wherein the characteristic of the first wireless transmission comprises received signal strength and the device configuration comprises a device state of the second wireless communication device.

11. A wireless communication device for implementing cooperative multi-node multiple-input multiple-output (MIMO) communications in device-to-device wireless communications, comprising:
    a transceiver system configured to receive and decode a first message included in a first wireless transmission received from a first remote wireless communication device participating in a device-to-device wireless communication session; and a control system configured to cause the wireless communication device to autonomously perform operations to
- selectively determine whether the wireless communication device should support the first remote wireless communication device with respect to communication of the first message to at least a second remote wireless communication device, and
- cause transmission of the first message by the transceiver system to occur synchronously with at least one retransmission of the first message by the first remote wireless communication device at a predetermined re-transmission time, when a determination is made that the wireless communication device should support the first remote wireless communication device with respect to communication of the first message to at least a second remote wireless communication device.

12. The wireless communication device according to claim 11, wherein the first messages transmitted by both of the wireless communication device and the first remote wireless communication device at the predetermined re-transmission time are matched with respect to frequency, coding and timing.

13. The wireless communication device according to claim 12, wherein the wireless communication device, and the first and second remote wireless communication devices each communicate in accordance with an LTE standard for device to device communication.

14. The wireless communication device according to claim 13, wherein the first message is selected from the group consisting of a control message and a data message.

15. The wireless communication device according to claim 14, wherein the first message is a control message and wherein the control system is further configured to subsequently decode in the wireless communication device a second message included in a second wireless transmission received from the first remote wireless communication device, the second message comprising a data message that is different than the first message.

16. The wireless communication device according to claim 15, wherein the control system is further configured to assist the first remote wireless communication device with respect to communication of the second message to at least the second remote wireless communication device by subsequently transmitting the second message using the wireless communication device.

17. The wireless communication device according to claim 16, wherein the control system is configured to cause transmission of the second message by the wireless communication device synchronously with at least one retransmission of the second message by the first remote wireless communication device at a predetermined re-transmission time for the second message that is known to both the wireless communication device and the remote first wireless communication device.

18. The wireless communication device according to claim 11, wherein a control system in the second remote wireless communication device is configured to
- decode the first message received from the wireless communication device; and
- selectively assisting the first wireless communication device with respect to communication of the first message to a third remote wireless communication device by subsequently transmitting the first message using the second remote wireless communication device,
- wherein transmission of the first message by the second wireless communication device is performed synchronously with at least one retransmission of the first message by the wireless communication device at a predetermined re-transmission time known to the second remote wireless communication device.

19. The wireless communication device according to claim 12, wherein the selective determination as to whether the wireless communication device should support the communications of the first remote wireless communication device is based on at least one of a device configuration, a characteristic of the first wireless transmission, a priority of the first message, and an assessment of a number of other supporting local devices.

20. The wireless communication device according to claim 19, wherein the characteristic of the first wireless transmission comprise a received signal strength and the device configuration comprises a device state of the wireless communication device.

* * * * *